United States Patent [19]

Nikkanen

[11] Patent Number: 4,918,926
[45] Date of Patent: Apr. 24, 1990

[54] PREDFIFFUSER FOR A GAS TURBINE ENGINE
[75] Inventor: John P. Nikkanen, West Hartford, Conn.
[73] Assignee: United Technologies Corporation, Hartford, Conn.
[21] Appl. No.: 380,459
[22] Filed: May 20, 1982
[51] Int. Cl.$^5$ ............................................... F02C 1/00
[52] U.S. Cl. ..................................................... 60/751
[58] Field of Search ................ 60/39.31, 39.32, 39.36, 60/39.37, 751, 744

[56] References Cited

U.S. PATENT DOCUMENTS

| 2,682,363 | 6/1954 | Lombard et al. | 60/39.37 |
| 2,711,072 | 6/1955 | Wetzler | 60/751 |
| 2,823,519 | 2/1958 | Spalding | 60/751 |
| 3,978,664 | 9/1976 | Parker et al. | 60/726 |
| 4,100,732 | 7/1978 | Bryans et al. | 60/39.36 |

FOREIGN PATENT DOCUMENTS 205220  5/1956  Australia ............................ 60/751

Primary Examiner—Louis J. Casaregula
Assistant Examiner—Timothy S. Thomas
Attorney, Agent, or Firm—Norman Friedland

[57] ABSTRACT

A prediffuser, immediately upstream of a dump diffuser for a gas turbine engine is constructed to have equal numbers of struts as there are fuel injectors in the annular combustor. The wedged shaped struts are disposed symmetrically about the annular diffuser. The relatively large blunt trailing edge enhances the circumferential expansion of the discharge air dumping into the dump diffuser which achieves a more uniform temperature profile of the cooling air cooling the burner liner and its associated components, and avoiding localized hot spots.

2 Claims, 3 Drawing Sheets

PREDFIFFUSER FOR A GAS TURBINE ENGINE

TECHNICAL FIELD

This invention relates to gas turbine engines utilizing annular types of burners and particularly to the construction of the prediffuser and its relationship to the burner.

BACKGROUND ART

As is well known, it is typical in a gas turbine engine to include struts in an annular type of diffuser for transmitting a load across the gas path, and providing passageway means for carrying oil and other engine service lines. Such diffusers are conventionally utilized to diffuse the compressor discharge air so as to convert the dynamic pressure to static pressure prior to being admitted into the burner. While there are present designs that disclose that the number of fuel nozzles in the head of the burner are some integer number relationship to the number of struts, such designs conventionally include more fuel nozzles than there are struts. Further, although the struts of heretofore designs considered the aerodynamics and structural integrity, the accepted practice never took into consideration the expansion of the flow in the circumferential direction.

In the heretofore designs, the trailing edge of the struts in the prediffuser were fabricated into a blunt edge, but spaced relatively far apart. Hence, a given design would typically include less struts than there were fuel nozzles and its attendant air passages. This inherently created uneven flow characteristics of the air discharging from the prediffuser into the dump diffuser.

I have found that by equalizing the number of struts to the number of fuel nozzles and centering the fuel nozzles relative to the passageways between struts, the flow characteristics are enhanced. This is occasioned by the fact that the circumferential blockage is increased whereby the radial dimension in the diffuser passage can accommodate an increased dimension so that the mixing of the flow discharging therefrom is more rapid than would otherwise be in heretofore designs. This has the characteristics of reducing or minimizing wakes and flow distortions and hence delivering a more uniform flow pattern to the burner, thus minimizing localized hot spots on the burner walls.

DISCLOSURE OF INVENTION

An object of this invention is to provide for a gas turbine engine having an annular type of combustor and improved diffuser. A feature of the invention is to provide an equal number of struts in the diffuser to the number of fuel nozzles in the head of the combustor. Another feature of this invention is to fabricate the strut of the diffuser in a wedge shape having the leading edge upstream and the blunt end on the downstream end and disposed parallel to the flow therein. The width of the trailing edge is made sufficiently large to obtain a predetermined expansion of the air discharging from the diffuser in the circumferential direction.

Other features and advantages will be apparent from the specification and claims and from the accompanying drawings which illustrate an embodiment of the invention.

BEST MODE FOR CARRYNG OUT THE INVENTION

Figure 1:
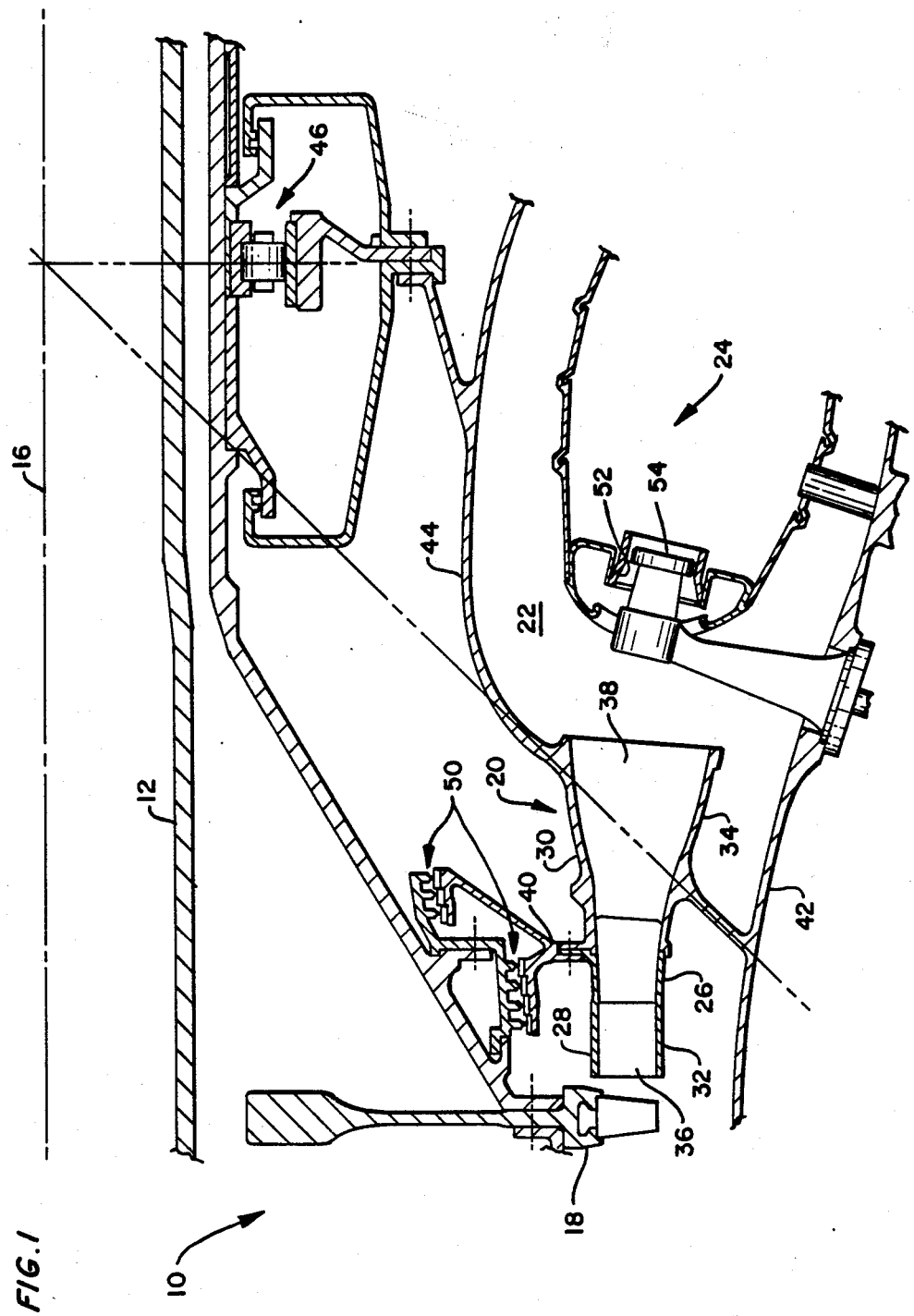
FIG. 1 is a partial view in section illustrating the details of this invention.

This invention is particularly adapted for use with a turbine power plant of the type exemplified by the JT9D engine manufactured by Pratt & Whitney Aircraft, a division of United Technologies Corporation, assignee of this patent application where an annular combustor is fed compressor air through a prediffuser and dump diffuser. As used herein, the term prediffuser is the annular type and is in direct communication with the compressor discharge air. The dump diffuser is fed by the prediffuser and is immediately upstream of the annular burner and feeds the fuel nozzles mounted in the head of the annular burner.

The invention can best be seen by referring to FIGS. 1, 2, 3a and 3b where it forms part of the gas turbine engine generally indicated by reference numeral 10 which is shown fragmentarily only to illustrate the details of the invention. As will be appreciated, this engine is typical of the JT9D type noted above, being a twin spool, axial flow compressor where shafts 12 and 14 are coaxially mounted about the engine centerline 16. Each shaft carries turbines and compressors on either end where one being the high pressure spool and the other being the low pressure spool. In this embodiment only a portion of the last stage of the high pressure compressor 18 is shown and the air discharging therefrom is fed to the prediffuser generally illustrated by reference numeral 20, the dump diffuser generally indicated by reference numeral 22 and the annular burner generally illustrated by reference numeral 24.

As can be appreciated from FIG. 1, the prediffuser 20 is at the end of the gas path structure 26 which comprises an annular inner wall 28 and the cooperating annular inner wall 30 axially extending therefrom, and the annular outer wall 32 and the cooperating annular outer wall 34 axially extending therefrom. The fore portion or gas path portion where the inner and outer walls are generally parallel carries a plurality of circumferentially spaced turning or guide vanes 36 and the diffuser portion 20 where the inner and outer walls diverge radially carries the struts 38 which will be described in further detail hereinbelow. The gas path and prediffuser structure is supported into position by the annular shells 40 which circumscribe the engine centerline and is formed integral with the engine outer case wall 42. The inner shell 44 extends radially inward and axially rearward to define the dump diffuser 24 and provide a support for the bearing generally indicated by reference numeral 46. The labyrinth seal generally indicated by reference numeral 50 together with shell 40 dams the compressor discharge flow so that essentially all the compressed air is directed to flow through the gas path and prediffuser structure.

As indicated above, the prediffuser 20 feeds the dump diffuser 22 which in turn feeds the annular burner 24 A portion of the air is admitted through a plurality of holes 52 formed at the head of the annular burner and are circumferentially spaced thereabout. A fuel nozzle and support 54 is supplied for each hole and in a typical installation the fuel nozzles would number, say 24.

In accordance with this invention the number of fuel nozzles 54 and the number of struts 38 are equal. Hence, in this particular installation there are twenty-four fuel nozzles and twenty-four struts. Additionally, the fuel nozzles are disposed so that each are aligned to be facing centrally of the space 58 defined between adjacent struts as best shown by the dash line indicated by reference letter A in FIG. 3(b).

Figure 3A:
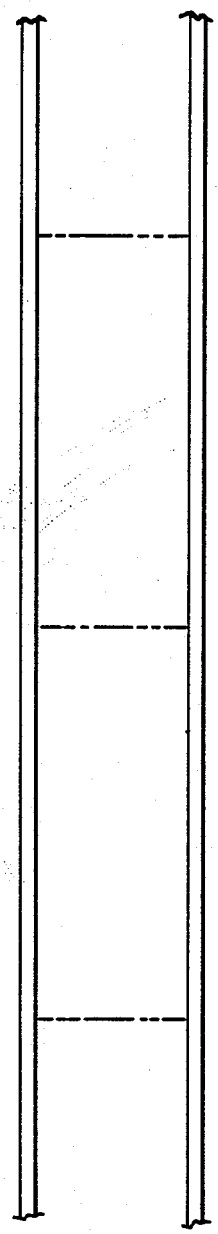
FIG. 3a is a developed front end view of the inlet of the diffuser.
Figure 3B:
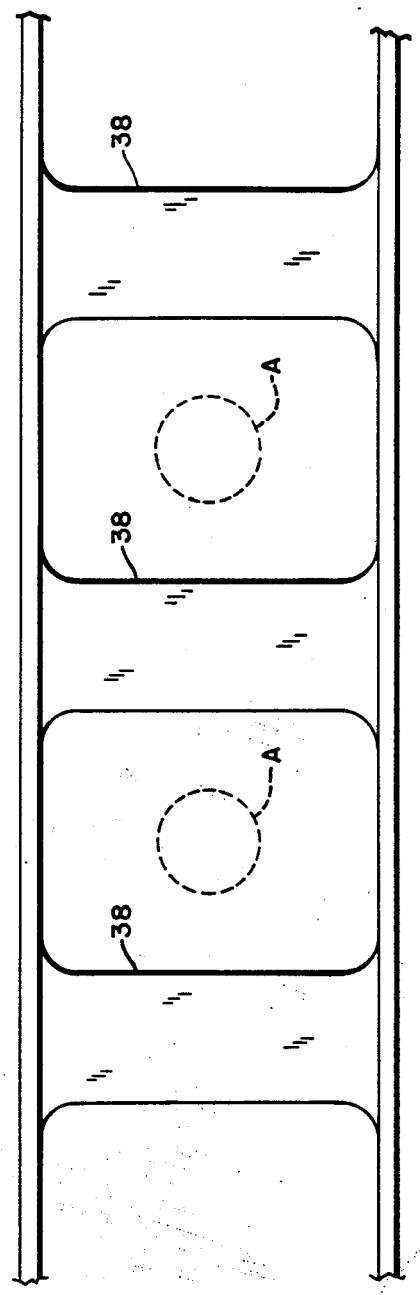
FIG. 3b is a developed rearend view of the diffuser.

As can be seen in FIGS. 3(a) and 3(b) the compressed air enters the annular inlet and is directed through the rectangularly shaped channels before being discharged into the dump diffuser.

Figure 2:
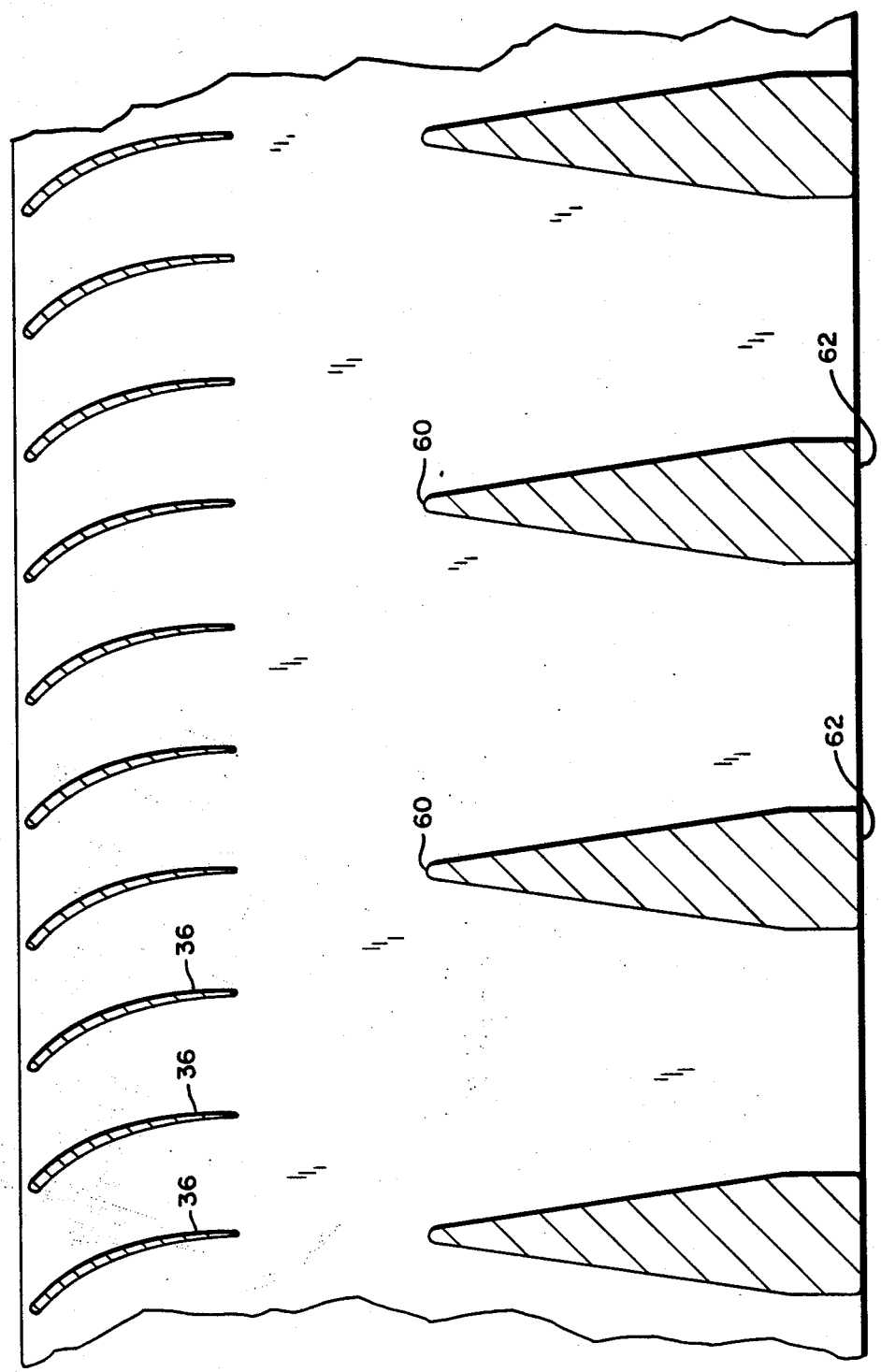
FIG. 2 is a developed partial view showing the relationship of the inlet guide vanes and struts in the diffuser.

Also, in accordance with this invention the struts 38 are formed into wedge shaped bodies having the leading edge 60 in the upstream end and the trailing edge 62 in the downstream end and being aligned parallel to the flow. The trailing edge as is apparent from FIG. 2 is blunted. This serves to enhance the flow in the circumferential direction with a consequential improvement in pressure pattern resulting in an improved cooling effect on the burner.

By virtue of this invention the following features are afforded:

(1) reduced distortion for both upstream potential field as well as downstream wakes, due to the reduced circumferential pitch of the struts;

(2) higher diffuser loading potential, same or lower losses;

(3) strut/diffuser area ruling effect is approximately one-dimensional;

(4) ample strut cross-section area for oil lines or vents;

(5) structurally stiff construction more uniform distribution of loads.

It should be understood that the invention is not limited to the particular embodiments shown and described herein, but that various changes and modifications may be made without departing from the spirit and scope of this novel concept as defined by the following claims.

I claim:

1. For a gas turbine engine having an engine case and a centerline, an axial flow compressor and an annular burner mounted in said engine case about the engine's centerline, an annular prediffuser interposed between said compressor and said burner and axially spaced therefrom, a shell surrounding and radially spaced from said burner defining a dump diffuser, said prediffuser having a pair of radially spaced annular shaped walls defining an annular passage for leading the air discharging from the compressor to said dump diffuser and then to said burner, a first portion of said spaced annular shaped walls being concentric relative to each other so as to define a vane section, vanes mounted between said spaced annular walls in said vane section for removing the swirl component from the swirling air discharging from said compressor, a second portion of said spaced annular walls diverging radially inwardly and outwardly relative to each other for defining a diffuser section, circumferentially spaced struts extending between said annular walls for defining therewith open ended passageways and each passageway having an axial centerline, a plurality of circumferentially spaced fuel nozzles in said annular burner, each having a centerline, the centerline of said each of said fuel nozzles being in coincidence with the centerline of each of said open ended passageways so that the number of said struts equals the number of said fuel nozzles and that the area of the discharge end of said annular diffuser is relatively the same relative to what it would be without the inclusion of said struts by extending the spaced annular walls radially to compensate for the area that would be taken up by said struts that would otherwise block the flow passing through the discharge end of the diffuser had the struts not been there.

2. For a gas turbine engine as in claim 1 wherein said struts are wedge-shaped having the narrower end upstream from the wider end and being disposed in the direction of the flow of diffuser air in said prediffuser, and said wider end being at the discharge end of said prediffuser.

* * * * *